(12) United States Patent
Sun

(10) Patent No.: US 12,303,987 B2
(45) Date of Patent: May 20, 2025

(54) GREEN BODY AND CUTTING TOOL HAVING HELICAL SUPERHARD-MATERIAL RAKE FACE

(71) Applicant: SHANGHAI NAGOYA PRECISION TOOLS CO., LTD., Shanghai (CN)

(72) Inventor: Si-Rui Sun, Shanghai (CN)

(73) Assignee: SHANGHAI NAGOYA PRECISION TOOLS CO., LTD., Shanghai (CN)

( * ) Notice: Subject to any disclaimer, the term of this patent is extended or adjusted under 35 U.S.C. 154(b) by 705 days.

(21) Appl. No.: 17/765,985

(22) PCT Filed: Mar. 26, 2021

(86) PCT No.: PCT/CN2021/083151
§ 371 (c)(1),
(2) Date: Apr. 1, 2022

(87) PCT Pub. No.: WO2021/197215
PCT Pub. Date: Oct. 7, 2021

(65) Prior Publication Data
US 2022/0339720 A1   Oct. 27, 2022

(30) Foreign Application Priority Data
Mar. 30, 2020 (CN) .......................... 202010240055.5

(51) Int. Cl.
B23C 5/10 (2006.01)
(52) U.S. Cl.
CPC ...... B23C 5/1009 (2013.01); *B23C 2226/125* (2013.01); *B23C 2226/18* (2013.01)

(58) Field of Classification Search
CPC ........ B23C 2226/125; B23C 2226/315; B23C 5/1009
See application file for complete search history.

(56) References Cited

U.S. PATENT DOCUMENTS

| | | | | |
|---|---|---|---|---|
| 5,707,185 A | * | 1/1998 | Mizutani ................. | B23C 5/202 407/53 |
| 5,759,185 A | * | 6/1998 | Grinberg ................... | B23C 5/28 606/180 |
| 8,176,825 B1 | * | 5/2012 | Isaacson .................. | B23H 7/02 83/854 |
| 10,399,153 B2 | * | 9/2019 | Matsuo .................... | B23B 51/06 |
| 2006/0239850 A1 | * | 10/2006 | DenBoer ................... | B22F 3/14 407/54 |
| 2013/0336731 A1 | * | 12/2013 | Nagashima ........... | B23C 5/1036 407/40 |

(Continued)

*Primary Examiner* — Sean M Michalski
(74) *Attorney, Agent, or Firm* — WPAT, PC

(57) ABSTRACT

A green body is provided. The green body is made of a superhard material, is used for being fixed on a matrix so as to be machined into a cutting edge part of a cutter. The green body includes a first side surface and a second side surface. Both the first side surface and the second side surface twist at a set helical angle. After being fixed to the matrix, the green body is machined into an edge part for cutting, such as a main cutting edge and a center cutting edge located on the green body made of a same superhard material. The green body is applied to machining the cutting edge of the cutter. A rotating center has a continuous and intact center cutting edge formed by a superhard material.

7 Claims, 5 Drawing Sheets

(56) References Cited

U.S. PATENT DOCUMENTS

| | | | |
|---|---|---|---|
| 2016/0001381 A1* | 1/2016 | Lach | B23C 5/28 |
| | | | 407/11 |
| 2017/0028584 A1* | 2/2017 | Freund | B27G 15/00 |
| 2017/0106454 A1* | 4/2017 | Matsuo | B23B 51/02 |
| 2017/0120344 A1* | 5/2017 | Igarashi | C23C 30/005 |
| 2020/0230714 A1* | 7/2020 | Rimchala | B23B 51/02 |
| 2022/0176472 A1* | 6/2022 | Cox | B23C 5/109 |
| 2022/0339720 A1* | 10/2022 | Sun | B23B 51/0002 |
| 2023/0037181 A1* | 2/2023 | Can | C22C 29/14 |
| 2024/0217009 A1* | 7/2024 | Hamil | B23C 5/1009 |

\* cited by examiner

GREEN BODY AND CUTTING TOOL HAVING HELICAL SUPERHARD-MATERIAL RAKE FACE

BACKGROUND

Technical Field

The present invention relates to a cutting tool, and in particular to a cutting tool having a helical superhard-material rake face.

Related Art

Polycrystalline diamond (PCD) cutters and cubic boron nitride (CBN) cutters offer solutions to cutting difficulties in materials difficult to be machined.

CBN or polycrystalline cubic boron nitride (PCBN) is an artificial synthetic material second only to diamond in hardness and having good high-temperature stability (an extremely high temperature will be generated during machining of hardened ferrous metal and superalloy materials). CBN cutters in different designs are used for continuously or intermittently cutting hardened ferrous metals, as well as for cutting and machining weld metals and composite metals.

The PCD cutter is made by welding a PCD material to a cutter body. Generally, the PCD cutter is produced from the PCD material and a matrix material by sintering diamond particles with a metal-based binder under a high temperature and a high pressure. A PCD cutter point can be cut by electrical discharge machining or laser, is welded to a hard alloy or steel matrix, and is then subjected to cutter sharpening to form the PCD cutter. This kind of cutter is particularly effective for high-speed machining of non-ferrous metals (such as aluminum) and highly abrasive synthetic materials and plastic. The PCD cutter is widely used for milling non-ferrous metals, composite materials, plastic, and super alloy extremely difficult to be machined.

Due to the characteristics of PCD and CBN, it is generally difficult to implement machining by common grinding methods. Especially, it is impossible to manufacture an intact helical edge tool, but a plurality of patches is used for forming a discontinuous helical edge.

For drills and ball knives, a center edge (also referred to as backlash or chisel edge) is located at a rotating center of a cutter and plays an important role in cutting. Due to a small rotating radius of the center edge, a linear speed is low, and it is difficult to control front and rear angles, quality of the center edge is particularly important for the life and machining of cutters.

A helix angle is also crucial to the cutting performance of the cutter. A large number of literatures show that the cutting performance of a cutter with a helix angle is better. For a cutter with an edge part made of a superhard material, how to obtain a superhard-material cutting edge with a helix angle and a superhard-material center edge part is a key direction of continuous exploration in the cutter manufacturing industry.

For example, the superhard material is attached to both sides of the rotating center to make a patch cutter. This kind of cutter adopts a tilted patching method similar to differential calculus, to divide an arc into several straight lines. Due to the characteristic of a small difference between an edge tilting angle and the helix angle within 15° with a short edge length (for example: the edge length does not exceed 10 mm), a cutting edge having an edge tilting angle less than or equal to 15° and similar to a helix-angle cutting edge can be obtained. The problem of this technology is that the tilted patching method will continuously reduce the thickness of a cutter core as the edge tilting angle increases when the edge length is constant, or as the edge length increases when the edge tilting angle is constant, until the cutter completely loses its rigidity. At the same time, one tool groove needs to be equipped with a superhard-material patch forming an edge, so it is impossible to make a helix or edge tilting angle greater than 15°, and the superhard material cannot be used for the center edge of the cutter.

In order to obtain an ideal center edge and helical main cutting edge made of the superhard material at the same time, in another example, a helical material sintering method (Element Six, UK) and an overall welding and ablation method (Iwag, Switzerland) are used. In general, the helical sintering method is to fill a blank pre-machined with a helical groove with powder of an unsintered superhard material, and then the blank and the superhard powder are simultaneously sintered to form a helical superhard edge part blank. By machining the sintered blank to generate a cutter with a helical edge, the main disadvantage of this solution is that the shape of the cutter is limited by the shape of the sintered blank, and the helix angle parameter cannot be arbitrarily controlled. The overall welding and ablation method is to weld an entire cylindrical material made of the superhard material to the first end of the cutter and perform subtractive machining on it to directly obtain the helical groove and the helical edge part. The machining is generally performed by laser. The main disadvantage of this solution is that a large number of a superhard material needs to be consumed, and thus the production cost is also high.

SUMMARY

One objective of the present invention is to provide a green body mounted on a matrix to make a cutter. A helix angle parameter can be arbitrarily controlled according to the design requirements of the cutter.

Another objective of the present invention is to provide a green body, thereby reducing the usage of a superhard material and reducing the manufacturing cost of a cutter.

Yet another objective of the present invention is to provide a green body mounted on a matrix to make a cutter. A continuous cutting edge is machined on a same superhard material to facilitate cutting machining and improve the surface quality.

A further objective of the present invention is to provide a cutting tool. The cutting tool can have a rake face greater than 15° and made of a helical superhard material, and is convenient for forming a continuous center cutting edge to facilitate implementation of cutting machining, and prolong the life of the cutter.

A fifth objective of the present invention is to provide a cutting tool having a continuous superhard-material center edge, and a superhard-material cutting edge having a helix angle greater than 15°, thus improving the machining accuracy and the machining efficiency, and prolonging the life of the cutter.

The superhard material is, for example, a composite material formed by metal ceramic, diamond (particularly artificial polycrystalline diamond) and CBN, or hard alloy and one or several of metal ceramic, diamond and CBN.

The cutting tool is a tool for cutting a material. Industrially, it is also referred to as a cutter, such as a generic term of a drill bit, a milling cutter, and a reamer for hole machining and molding machining.

A green body is provided. The green body is made of a superhard material, and is used for being fixed on a matrix so as to be machined into a cutting edge part of a cutter. The green body includes a first side surface and a second side surface. Both the first side surface and the second side surface twist at a set helical angle.

According to a specific implementation, the green body is platy, and has a thickness greater than 0.3 mm and less than or equal to 4 mm, a length greater than 4 mm and less than or equal to 20 mm, and a width greater than 4 mm and less than or equal to 20 mm.

According to another specific implementation, the green body is platy, and has a thickness greater than 0.3 mm and less than or equal to 2 mm, a length greater than 4 mm and less than or equal to 16 mm, and a width less than or equal to 4 mm.

After being fixed to the matrix, the green body is machined into an edge part for cutting, such as a main cutting edge and a center cutting edge located on the green body made of a same superhard material.

The green body further includes a third surface intersected with the first side surface and the second side surface such as a plane, a curved surface, or a folding surface. After the green body is mounted on the matrix, the third surface is located at a first end in a feeding direction of the cutter, and made of the same superhard material.

A machine tool having a rotating shaft is used for cutting the superhard material to obtain the green body of the present invention.

In order to facilitate the machining of the cutter, the first helical surface and the second helical surface of the green body are generally parallel to each other. The helical surface is obtained by plane torsion. That is, by cutting out at a same angle, the area of any section obtained is equal.

A cutter includes:

a platy green body, made of a superhard material and including a first plate surface and a second plate surface, the first plate surface at least including a first helical surface, and the second plate surface at least including a second helical surface; and a matrix, including a main body and a longitudinal axis, the main body rotating around the longitudinal axis, one end of the main body being set into a handle part capable of being mounted on rotary machinery, an other end being machined into a cutting part for implementing cutting machining, and the cutting part including a helical slot body crossing in a radial direction.

The green body and the slot body are assembled (by, for example, welding or bonding). A center cutting edge close to the longitudinal axis and having a rake face and a flank face, and a main cutting edge having a rake face and a flank face are then machined and formed on the green body.

A main cutting edge is made of a continuous and intact superhard material, and has a helical rake face (such as greater than 15°). A center cutting edge is made of the same intact superhard material and crosses a rotating center.

The technical solution of the present invention achieves the following beneficial effects:

Compared with the related art, the cutter provided by the present invention has the beneficial effects that the main cutting edge formed by the continuous and intact superhard material is obtained; the helical rake face greater than 15° can be prepared, which is more favorable for cutting machining, such as significantly reducing a cutting force, improving chip removal, prolonging the life of the cutter, and improving the surface quality.

According to the cutter provided by the present invention, the rotating center has the continuous and intact center cutting edge formed by the superhard material. Compared with an existing cutter, the cutter provided by the present invention has the beneficial effects that the machining accuracy and the machining efficiency are improved, and the intensity of the center is improved; the life during cutting machining is prolonged; and the overall cutting performance of the cutter is significantly improved.

Compared with the helical material sintering method, the technical solution of the present invention has the beneficial effects that a shape of the cutter prepared is not limited by the shape of the sintered blank, and the helix angle parameter can be arbitrarily controlled according to the design requirements of the cutter.

Compared with the overall welding and ablation method, the technical solution of the present invention has the beneficial effects that according to the cutter prepared, usage of the superhard material can be greatly reduced, and the manufacturing cost of the cutter is reduced.

DETAILED DESCRIPTION

The technical solution of the present invention is described below in detail with reference to the accompanying drawings. The embodiments of the present invention are merely illustrative of the technical solution of the present invention and are not limiting. Although the present invention is described in detail with reference to the preferred embodiments, it should be understood that those of ordinary skill in the art can make modifications or equivalent replacements to the technical solutions of the present invention without departing from the spirit and scope of the technical solution of the present invention. These modifications and equivalent replacements shall fall within the scope of claims of the present invention.

Figure 1:
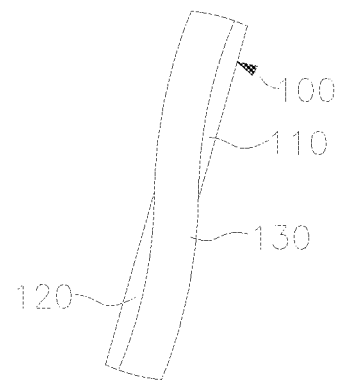
FIG. 1 is a schematic diagram of an embodiment of a green body of the present invention.
Figure 2:
FIG. 2 is a schematic diagram of an angle of the green body shown in FIG. 1.
Figure 3:
FIG. 3 is a schematic diagram of another angle of the green body shown in FIG. 1.
Figure 4:
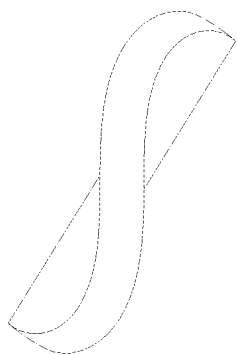
FIG. 4 is a schematic diagram of another embodiment of a green body of the present invention.
Figure 5:
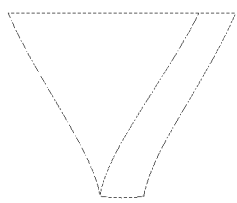
FIG. 5 is a schematic diagram of an angle of the green body shown in FIG. 4.
Figure 6:
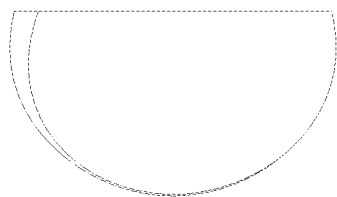
FIG. 6 is a schematic diagram of another angle of the green body shown in FIG. 4.
Figure 7:
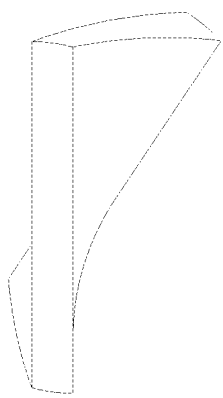
FIG. 7 is a schematic diagram of an embodiment of a green body of the present invention.
Figure 8:
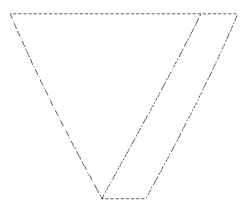
FIG. 8 is a schematic diagram of an angle of the green body shown in FIG. 7.
Figure 9:
FIG. 9 is a schematic diagram of another angle of the green body shown in FIG. 7.

FIG. 1 is a schematic diagram of an embodiment of a green body of a cutter of the present invention. FIG. 2 is a schematic diagram of an angle of the green body shown in FIG. 1. FIG. 3 is a schematic diagram of another angle of the green body shown in FIG. 1. As shown in FIG. 1, FIG. 2, and FIG. 3, a machine tool having a rotating shaft is used for cutting a superhard material to obtain a green body 100. The green body is overall platy, including a first side surface (or referred to as a plate surface) 110 and a second side surface (or referred to as a plate surface) 120, and both of them twist at a set helix angle. Specifically, a helical cutting method for feeding a cutter from a side surface for cutting and rotating a composite sheet while cutting, instead of a method for clamping a superhard-material composite sheet, is used for obtaining a green body having a helical side surface.

The green body further includes a plane 130 having a planar shape and intersected with the first side surface 110 and the second side surface 120. Similarly, the third plane 130 may also use a curved surface or a folding surface, as shown in FIG. 4, FIG. 5, FIG. 6, FIG. 7, FIG. 8, and FIG. 9, for example, so as to facilitate the subsequent application in machining of a cutting edge. In this embodiment, the platy body has a thickness greater than 0.3 mm and less than or equal to 4 mm, a length greater than 4 mm and less than or equal to 20 mm, and a width greater than 4 mm and less than or equal to 20 mm.

Figure 10:
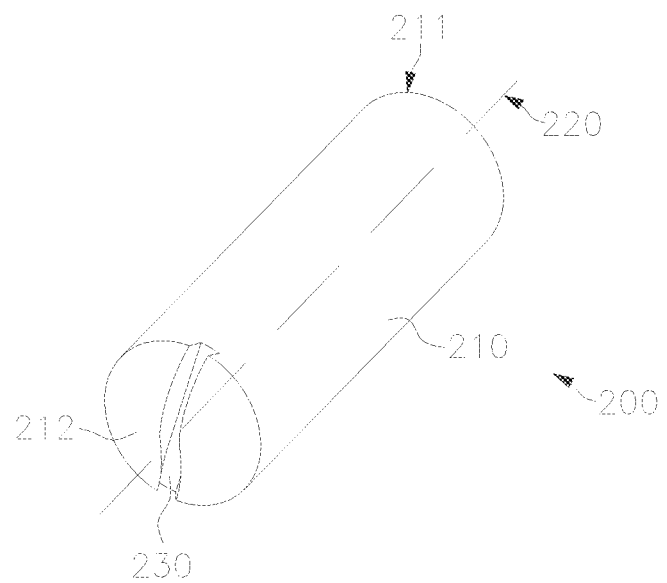
FIG. 10 is a schematic diagram of an embodiment of a matrix of a cutter of the present invention.
Figure 11:
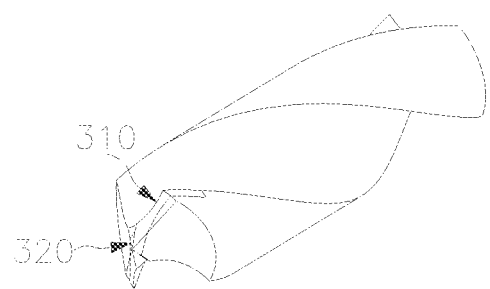
FIG. 11 is a schematic diagram of an embodiment of a cutter of the present invention.

FIG. 10 is a schematic diagram of an embodiment of a matrix of a cutter of the present invention. As shown in FIG. 10, a matrix 200 includes a main body 210 and a longitudinal axis 220. The main body 210 rotates around the longitudinal axis 220. One end of the main body 210 is capable of being mounted on a handle part 211 on rotary machinery. An other end of the main body is configured to be machined into a cutting part 212 for implementing cutting machining. The cutting part 212 includes a helical slot body 230 crossing in a radial direction. Referring to FIG. 1, FIG. 2, FIG. 3, and FIG. 10, as shown in FIG. 11, the green body 100 and the slot body 230 are assembled, and are fixed via welding or bonding to obtain a blank used for manufacturing a cutter. A center cutting edge 310 close to the longitudinal axis and having a rake face and a flank face, and a main cutting edge 320 having a rake face and a flank face are then machined and formed on the green body 100. The main cutting edge 320 is made of a continuous and intact superhard material, and has a helical rake face (such as greater than 15°). The center cutting edge 310 is made of the same intact superhard material and crosses a rotating center.

Figure 12:
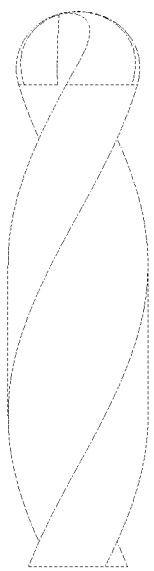
FIG. 12 is a schematic diagram of another embodiment of a cutter of the present invention.
Figure 13:
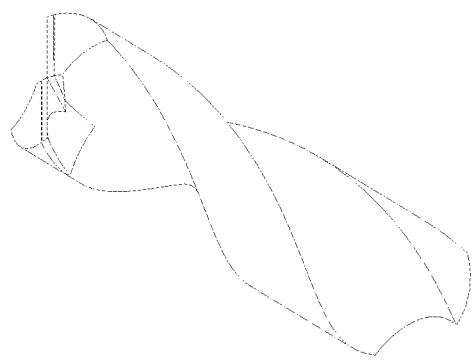
FIG. 13 is a schematic diagram of another embodiment of a cutter of the present invention.

FIG. 12 is a schematic diagram of another embodiment of a cutter of the present invention. FIG. 13 is a schematic diagram of another embodiment of a cutter of the present invention. With reference to FIG. 4, FIG. 5, FIG. 6, FIG. 7, FIG. 8, and FIG. 9, as shown in FIG. 12 and FIG. 13, the form of the third surface of the green body 100 is changed, but is not limited to, for example, a curved surface or a folding surface. Cutters in various forms can be machined on demand, such as a ball-end cutter.

What is claimed is:

1. A blank for manufacturing a cutter, wherein the blank comprises a main body, one end of the main body is machined into a cutting part, and the cutting part comprises a helical slot body crossing in a radial direction; and a green body is assembled with the slot body and is fixed via welding or bonding; the green body, made of a superhard material, wherein the green body is capable of being machined into a cutting edge part of a cutter, the green body comprising a first side surface and a second side surface both twisting at a set helix angle;

the edge part comprises a main cutting edge and a center cutting edge located on the green body made of a same superhard material; and the green body is platy, and has a thickness greater than 0.3 mm and less than or equal to 4 mm, a length greater than 4 mm and less than or equal to 20 mm, and a width greater than 4 mm and less than or equal to 20 mm.

2. The blank for manufacturing the cutter according to claim 1, further comprising a third surface intersected with the first side surface and the second side surface, located at a first end in a feeding direction of the cutter, and made of the same superhard material.

3. The blank for manufacturing the cutter according to claim 2, wherein the third surface is a plane, a curved surface, or a folding surface.

4. The blank for manufacturing the cutter according to claim 1, wherein the green body is platy, and has the thickness greater than 0.3 mm and less than or equal to 2 mm, the length greater than 4 mm and less than or equal to 16 mm, and the width less than or equal to 4 mm.

5. A cutting tool, comprising:

a platy green body, made of a superhard material and comprising a first plate surface and a second plate surface, the first plate surface at least comprising a first helical surface, and the second plate surface at least comprising a second helical surface; and a matrix, comprising a main body and a longitudinal axis, the main body rotating around the longitudinal axis, one end of the main body being set into a handle part capable of being mounted on rotary machinery, an other end being machined into a cutting part for implementing cutting machining, and the cutting part comprising a helical slot body crossing in a radial direction, wherein the green body and the slot body are assembled, and a center cutting edge close to the longitudinal axis and having a rake face and a flank face, and a main cutting edge having a rake face and a flank face are then machined and formed on the green body;

a main cutting edge is made of a continuous and intact superhard material, and has a helical rake face; and a center cutting edge is made of a same intact superhard material and crosses a rotating center; and the green body is platy, and has a thickness greater than 0.3 mm and less than or equal to 4 mm, a length greater than 4 mm and less than or equal to 20 mm, and a width greater than 4 mm and less than or equal to 20 mm.

6. The cutting tool according to claim 5, wherein the green body is obtained by using a machine tool having a rotating shaft to cut the superhard material.

7. The cutting tool according to claim 5, wherein the first helical surface and the second helical surface of the green body are generally parallel to each other, and the helical surfaces are obtained by plane torsion.

* * * * *